J. E. LEONARD.
FINDER IN COMBINATION WITH CAMERA SHIFTING MECHANISMS FOR FOCUSING.
APPLICATION FILED APR. 20, 1917. RENEWED FEB. 12, 1919.
1,297,704.
Patented Mar. 18, 1919.
2 SHEETS—SHEET 1.
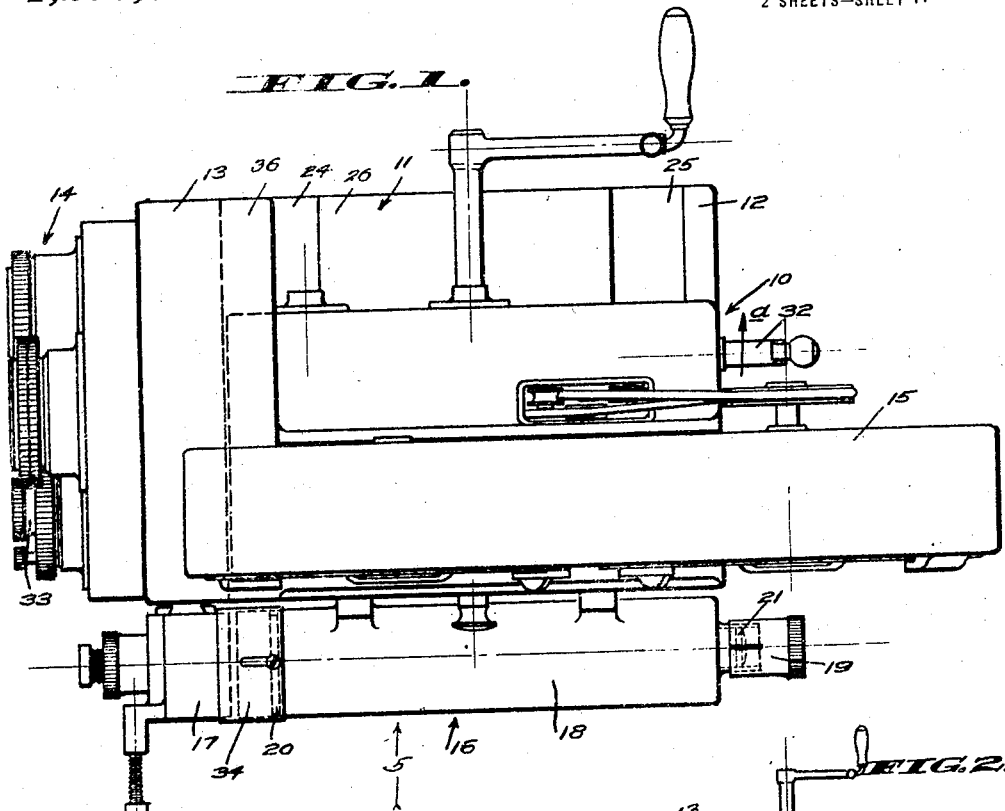
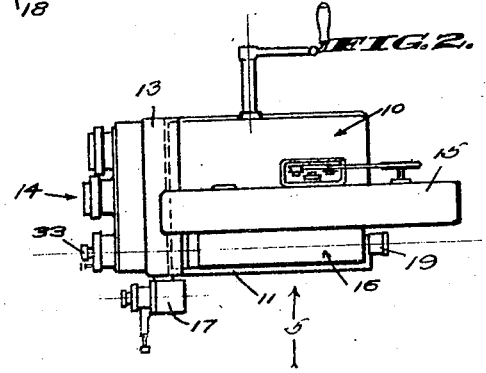
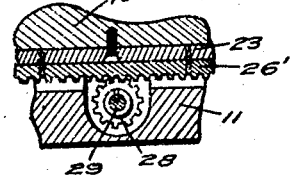
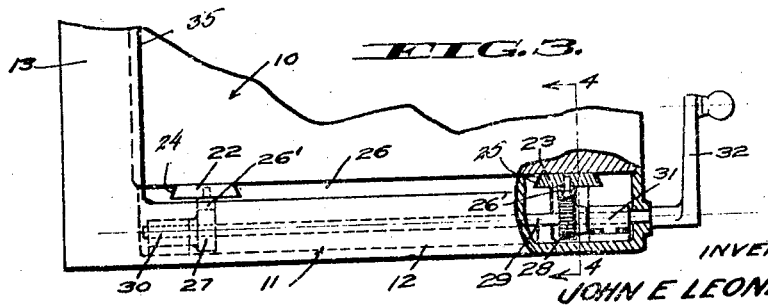
INVENTOR
JOHN E LEONARD
BY Hazard & Miller
att'ys

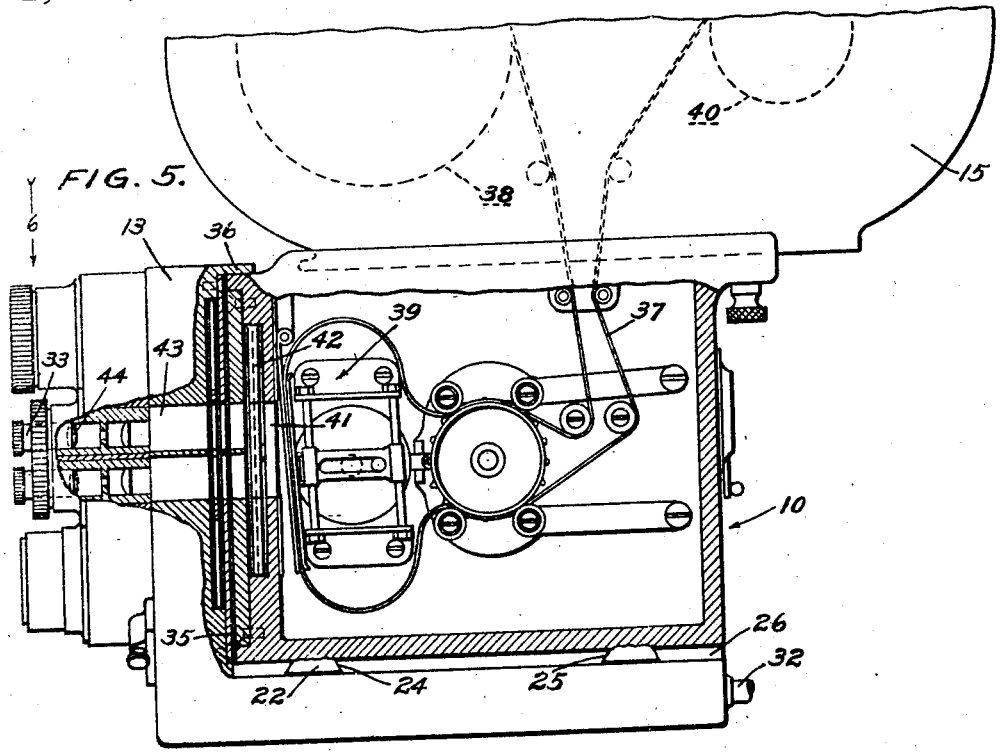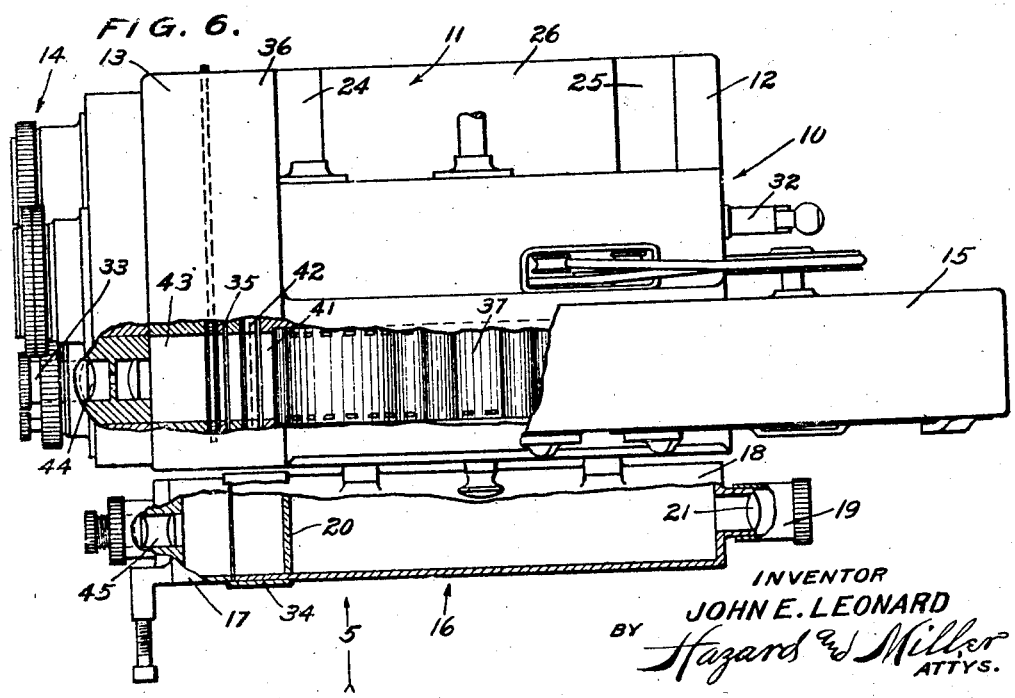

UNITED STATES PATENT OFFICE.

JOHN E. LEONARD, OF LOS ANGELES, CALIFORNIA.

FINDER IN COMBINATION WITH CAMERA-SHIFTING MECHANISMS FOR FOCUSING.

1,297,704.  Specification of Letters Patent.  Patented Mar. 18, 1919.

Application filed April 20, 1917, Serial No. 163,499. Renewed February 12, 1919. Serial No. 276,604.

*To all whom it may concern:*

Be it known that I, JOHN E. LEONARD, a citizen of the United States, residing at Los Angeles, in the county of Los Angeles and State of California, have invented new and useful Improvements in Finders in Combination with Camera-Shifting Mechanisms for Focusing, of which the following is a specification.

This invention relates to a camera and particularly pertains to a shifting mechanism for moving picture cameras.

It has been common practice in most moving picture camera work to set the camera by means of a finder disposed along one side of the camera and in substantially horizontal alinement with the photographic lenses. This method of location has several disadvantages which have rendered it uncertain in the register of the scenes. It is the principal object of this invention to provide means whereby the camera may be mechanically shifted to permit the photographic lens to register with the finder and thereby insure that the location and focus of the lens will be exactly proper to agree with the location of the film and shutter during the operation of the camera.

Another object of this invention is to provide means whereby the scene being photographed may be continuously observed through an auxiliary lens disposed in combination with the finder and which will produce an image upon the ground glass substantially the same as the image projected upon the film.

Another object of this invention is to provide simple means for shifting the camera as a unit so that the finder may be brought to register with the photographic lenses.

Another object of this invention is to provide simple means whereby the finder may be connected to the auxiliary lenses in a detachable manner so that no light rays will leak into the finder at the joint between the two members.

It is a further object of this invention to provide a device of the above character which is simple in its construction and will positively produce the results desired without damage to any portion of the film or the possibility of the scene being out of proper register with the film.

Other objects will appear hereinafter.

The invention is illustrated, by way of example, in the accompanying drawings in which:

Figure 1 is a view in plan illustrating the entire camera and particularly showing the position at which the finder is mounted thereupon.

Fig. 2 is a view in plan drawn on a reduced scale and illustrates the camera shifted to bring the finder in register with the photographic lens.

Fig. 3 is a view in section and elevation illustrating the shifting mechanism by which the camera is shifted in and out of register with the photographic lens.

Fig. 4 is a view in transverse section as seen on the line 4—4 of Fig. 3 and particularly discloses the rack and pinion construction of the shifting mechanism.

Fig. 5 is a side elevation looking in the direction indicated by the arrows 5 in Figs. 1, 2 and 6, parts being broken away and shown in section.

Fig. 6 is a top plan view, as indicated by the arrow 6 in Fig. 5, parts being broken away and shown in section, the view being analogous to Fig. 1 and the camera case being shifted to photographing position.

Referring more particularly to the drawings, 10 indicates a camera case which is mounted upon a base block 11. This block is formed with a horizontal portion forming the camera support 12 and a perpendicular end portion forming the lens support 13 which extends upwardly in front of the camera case. This portion 13 is fitted with a lens battery 14 consisting of a series of lenses mounted and adapted to be brought singly into register with the shutter and aperture. Mounted above and upon the case 10 is a film magazine 15 which is adapted to inclose the film upon which the negative is made. Mounted at the side of the camera is a finder 16 which is composed of a fixed lens box 17, a tube 18 and an eye piece 19. The lens box 17 is secured upon the side of the upright portion 13 of the base block, while the tube 18 is secured to the side of the camera case 10. A ground glass 20 is mounted at the forward end of the tube 18 and is adapted to be observed through the eye piece 19 and the lens 21.

The camera case 10 is formed with dovetailed guides 22 and 23 which extend crosswise of the case and are secured to its under side. These members are positioned within grooves 24 and 25 formed upon a plate 26 which is formed upon the upper face of the base portion 12. Toothed racks 26' are disposed parallel to each other and secured to the bottoms of the guide members 22 and 23. The racks are in engagement with actuating pinions 27 and 28 which are mounted within a recess in the base block. The pinions are rotatably supported upon a shaft 29 which is mounted at its ends within bearings 30 and 31. The shaft extends outwardly from the base block at the rear end thereof and is there fitted with a shifting lever 32 by which the entire case with its film magazine and the finder tube are shifted horizontally of the base.

Referring to Fig. 5, there is a crack 35 between the face of the camera case 10 and the rear face of the lens support 13, and a ledge 36 extends from the upper part of the lens support 13 over the upper part of the camera case 10 to cover this crack and exclude light.

The film 37 leads from the roll 38 in the magazine 15 downwardly through the top of the camera case 10 over and through the film feeding mechanism 39 and back through the top of the camera case to the roll 40. The film is fed past the shutter aperture 41 behind the shutter mechanism 42 and light comes to the shutter mechanism 42 through the exposure aperture 43 and the photographic lenses 44 in the lens mechanism 33.

In operation, the camera is set upon a tripod and secured by means of the base block 11. The shifting lever 32 is swung in the direction of the arrow —a—, as indicated in Fig. 1 and will cause the entire camera case 10 to move horizontally in that direction. This will bring the tube 18 of the finder into register with the exposure aperture 43 through the base block and in communication with photographic lens mechanism 33. It will be understood that this is the lens mechanism through which the photographic exposures are taken and that when the finder tube 18 is in this position, as shown in Fig. 2 observation through the eye piece 19 will permit the lens 44 to be exactly focused. After the photographic lenses 44 have been properly focused the shifting lever 32 may be swung to its normal position and will simultaneously cause the camera case and the finder tube 18 to be swung to their original positions as shown in Figs. 1 and 6. This will cause the tube 18 to register with the aperture 45 through the finder lens case 17 and will bring the shutter mechanism 42 and the aperture 41 of the camera into register with the exposure aperture 43 and the photographic lens mechanism 33. The camera may then be operated and the scenes observed through the eye piece of the finder. In order that the light will not leak in at the joint between the finder case 17 and the tube 18, a slidable sleeve 34 is provided and may be slipped over the adjacent ends of these members.

It will thus be seen that the shifting mechanism here provided is simple in its operation and will facilitate in rapidly setting up a camera for operation, as well as insuring that the scenes will be properly recorded upon the photographic film.

While I have shown the preferred construction of my finder in combination with a camera shifting mechanism for focusing as now known to me, it will be understood that various changes in the combination, construction and arrangement of parts may be made by those skilled in the art without departing from the spirit of my invention.

The film feeding mechanism 39 is shown, described and claimed in my co-pending application, filed April 20, 1917, Serial No. 163,496, and the double exposing photographic lens mechanism 33 is shown, described and claimed in my companion application, filed April 20, 1917, Serial No. 163,497, and the shutter mechanism 42 is shown, described and claimed in my companion application, filed April 20, 1917, Serial No. 163,500, and I do not wish to make such claims herein.

I claim:

1. In a shifting mechanism for cameras, the combination with a camera case, of a base upon which said case is mounted, a photographic lens positioned upon said base, a finder lens mounted upon the base beside the photographic lens, a finder tube secured along one side of the case, and mechanically operated means for shifting the finder tube and case into register with the photographic lens and thereafter shifting it out of register with the photographic lens and shifting the case to its normal position.

2. In a shifting mechanism for cameras, the combination with a photographic lens having an exposure aperture with which said lens registers, and a finder lens mounted beside the photographic lens, of a finder tube and camera, means whereby the finder tube and camera may be shifted to register the finder tube with the photographic lens to permit the photographic lens to be properly focused, and means to allow the tube to be restored to its normal position and the lens brought to register with the camera.

3. In a camera shifting mechanism, the combination with a base block, of a photographic lens supported upon said block, a finder lens supported upon the block, a camera case slidably mounted upon said block, a finder tube secured to the side of said case, and shifting means for moving the case and finder tube in and out of register with the photographic lens.

4. In a camera shifting mechanism, a fixed photographic lens, a fixed finder lens beside the photographic lens, a camera case having a shutter adapted to register with said photographic lens, a finder tube secured to the side of said case, and means whereby the shutter and finder tube may be alternatively brought to register with said photographic lens, and the finder tube brought into and out of register with the finder lens.

5. In a camera shifting mechanism, a fixed photographic lens, a fixed finder lens beside the photographic lens, a photographic shutter normally in register with the photographic lens, a finder tube disposed alongside of said shutter, and means whereby said shutter and finder tube may be alternatively brought to register with the photographic lens.

6. In a camera shifting mechanism, a fixed photographic lens having an exposure aperture, a fixed finder lens beside the photographic lens, a camera adapted to register with the photographic lens, a finder tube disposed alongside said camera, and means whereby the camera and finder tube may be alternatively brought to register with the photographic lens.

7. In a camera shifting mechanism, a fixed photographic lens, a fixed finder lens mounted beside the photographic lens, a camera adapted to carry a photographic film adapted to register with said photographic lens, a finder tube disposed alongside said camera, and means whereby said finder tube and camera may be alternatively brought to register with the photographic lens.

8. In a camera shifting mechanism, a camera support, a lens support extending upwardly from the camera support, photographic lens mechanism mounted upon the lens support, a finder lens mounted upon the lens support, a camera slidingly mounted upon the camera support and having photographing mechanism adapted to move into and out of register with the photographic lens mechanism, and a finder tube and eyepiece mounted upon the camera and adapted to register alternatnvely with the finder lens and with the photographic lens mechanism.

9. In a camera shifting mechanism, a camera support, a lens support extending upwardly from one end of the camera support, photographic lens mechanism mounted upon the lens support, a finder lens mounted upon the lens support, a camera mounted upon the camera support, means forming a dove-tail connection between the camera and camera support, gear racks carried by the camera, a shaft in the camera support, and gears upon the shaft meshing with the gear racks, so that by manipulating the shaft the camera may be moved into and out of registry with the photographic lens mechanism and the finder alternatively moved from the finder lens to the photographic lens.

In testimony whereof I have signed my name to this specification.

JOHN E. LEONARD.